United States Patent

Simpson

[15] 3,667,280
[45] June 6, 1972

[54] METHOD FOR DETERMINING THE FREEZING POINT OF A HYDROCARBON

[72] Inventor: Samuel W. Simpson, Florissant, Mo.
[73] Assignee: Shell Oil Company, New York, N.Y.
[22] Filed: July 15, 1970
[21] Appl. No.: 54,976

[52] U.S. Cl. .................................................73/17 R
[51] Int. Cl. .................................................G01n 25/02
[58] Field of Search.......................................73/17

[56] References Cited

UNITED STATES PATENTS

| | | | |
|---|---|---|---|
| 3,360,993 | 1/1968 | MacMillan | 73/361 |
| 3,267,228 | 8/1966 | Solomons | 73/17 |
| 3,564,900 | 2/1971 | Andre et al. | 73/17 |

FOREIGN PATENTS OR APPLICATIONS 1,176,907  1/1970  Great Britain..............................73/17

OTHER PUBLICATIONS

ASTM Testing Method D1015 pp. 141– 143.

Primary Examiner—Richard C. Queisser
Assistant Examiner—Herbert Goldstein
Attorney—Harold L. Denkler and Theodore E. Bieber

[57] ABSTRACT

Method for detecting the freezing point of a hydrocarbon by placing a measured sample of the hydrocarbon in a container and placing a thermistor in the container into contact with the sample. The container is cooled until its temperature curve shows a noticeable plateau which is detected by the slope of the temperature curve which is being tracked by a first derivative circuit. The container is then insulated thus warming the sample and, as the last crystals in the sample melt, the slope of the curve momentarily accelerates causing the circuit to produce a voltage peak which is the freezing point of the sample.

4 Claims, 3 Drawing Figures

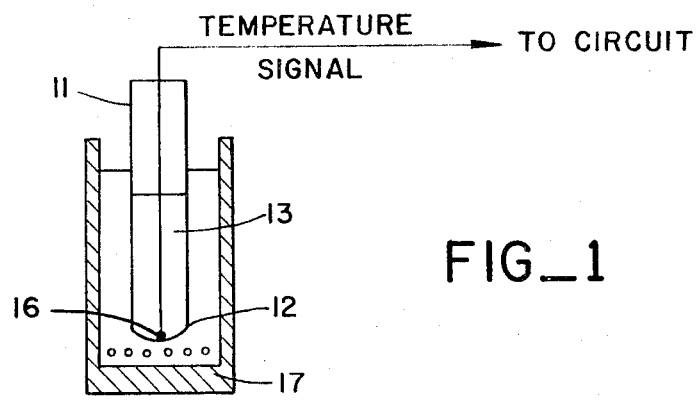
FIG_1
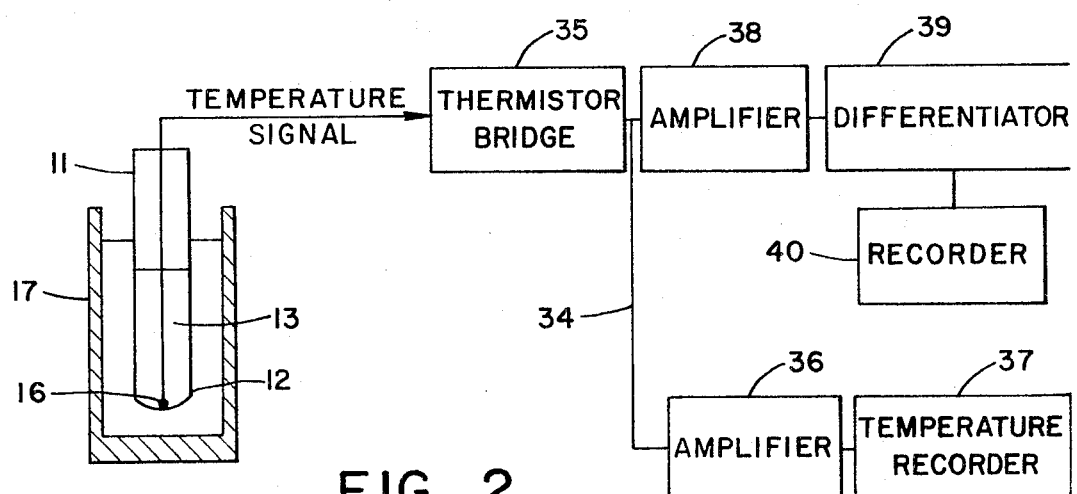
FIG_2
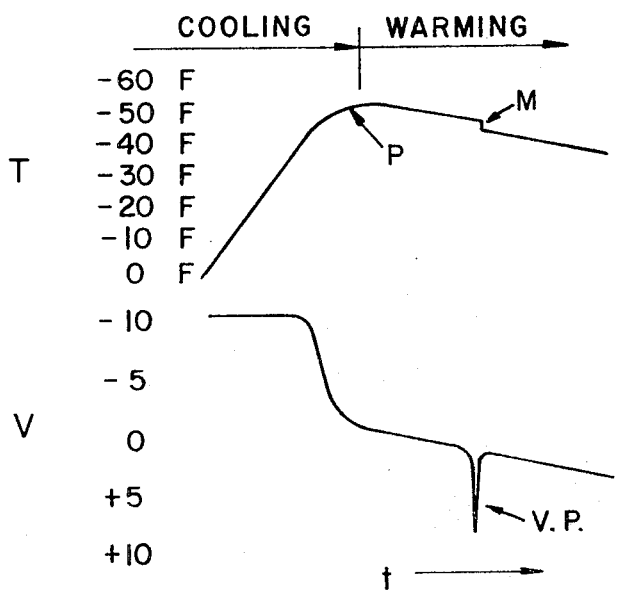
FIG_3
INVENTOR.
SAMUEL W. SIMPSON
BY
Harold L. Dinkler
ATTORNEY

METHOD FOR DETERMINING THE FREEZING POINT OF A HYDROCARBON

BACKGROUND OF THE INVENTION

1. Field of the Invention

This invention relates to a method for determining the freezing point of a normally liquid composition having constituents which crystallize upon cooling; and, more particularly, it relates to a method and apparatus for determining the freezing point of a hydrocarbon, such as aviation fuel.

2. Description of the Prior Art

The freezing point of hydrocarbon fuels, such as an aviation fuel, is determined by both the American Society For Testing and Materials (ASTM) method number D–2386 and the Institute of Petroleum Standards (IP) method number IP–16 which are identical and are world-wide accepted standard test methods. Freezing point is a required specification for all aviation fuels marketed in this country. The ASTM method describes a procedure for the detection of separated solids in aviation reciprocating engine and turbine engine fuels at any temperature likely to be encountered during flight or on the ground. This test is subject to the operator's interpretation and is very time consuming since the sample being tested has to be kept under constant visual surveillance.

Briefly, in the determining of a freezing point by the aforementioned IP and ASTM methods, a measured quantity, as for example, 25 milliliters, of previously dried hydrocarbon is placed in a jacketed sample tube and cooled at a prescribed cooling rate while being constantly stirred until crystals begin to form in the hydrocarbon. The sample tube is then removed from the coolant and, while still being stirred, is gradually warmed and kept under constant observation for disappearance of the last crystals within the hydrocarbon. As the last crystal melts or disappears, the temperature of the hydrocarbon is observed and recorded as the freezing point.

Since all aviation fuels have freezing point specifications which must be rigidly adhered to, it is necessary to provide process units with prompt and accurate freezing point data for optimum plant control. Thus, it is desirable to have a technique for detecting the freezing point of an aviation fuel which eliminates the need for visual observations in a laboratory instrument so as to both save in manpower and free the operator for other duties during the running of such tests.

SUMMARY OF THE INVENTION

It is a method for determining the freezing point of a normally liquid composition having constituents which crystallize upon being cooled which does not require visual observation.

It is a further object of this invention to provide a method for determining the freezing point of a normally liquid composition having constituents which crystallize upon being cooled which can be readily incorporated in an automatic processing system.

It is a still further object of this invention to provide a method for determining the freezing point of an aviation fuel while minimizing the human element and thus improve the quality of the resulting determinations.

These and other objects are preferably accomplished by placing a measured sample of the hydrocarbon in a container and placing a thermistor in the container into contact with the sample. The container is cooled until its temperature shows a noticeable plateau which is detected by the slope of the temperature curve which is being tracked by a first derivative circuit. The container is then insulated thus warming the sample and, as the last crystals in the sample melt, the slope of the curve momentarily accelerates causing the circuit to produce a voltage peak which is the freezing point of the sample.

BRIEF DESCRIPTION OF THE DRAWINGS

FIGS. 1 and 2 are vertical sectional views, partly schematic, of preferred apparatus for carrying out the techniques of my invention; and FIG. 3 is a graphical illustration of the determination of the freezing point of the sample of FIG. 1 in accordance with my invention.

DESCRIPTION OF THE PREFERRED EMBODIMENT

Although the invention will be described hereinbelow with respect to a hydrocarbon, and more particularly, to oils, the techniques disclosed herein are applicable to the determination of the freezing point of any normally liquid composition having constituents which crystallize upon being cooled, such as synthetic lubricating oils, mineral hydrocarbon oils, and fuel oils, such as aviation fuel.

Referring now to the drawing, a system will be described showing apparatus whereby the freezing point of a hydrocarbon fuel may be detected. This is accomplished by automatically detecting both the temperature at which crystals appear in a sample of hydrocarbon that is being cooled and disappear in the same hydrocarbon as it is being warmed. These temperatures are precisely the same as measured by the ASTM method even though the sample is not being stirred when the crystals form or melt and the crystals are observed by electrical means rather than visual.

Thus, referring now to FIG. 1, a container in the preferred form of a test tube 11 is shown having a preferably rounded or conically shaped bottom 12. For example, a test tube having a length of 24 centimeters and an outside diameter of 2.2 centimeters may be used. A measured quantity of a sample 13 of a normally liquid composition having constituents which crystallize upon being cooled is placed in test tube 11. For example, with a test tube of the dimensions previously given, a quantity of 25 milliliters of kerosene is placed in test tube 11. A temperature measuring device, in the preferred form of a thermistor 16, is placed in test tube 11 until it comes into contact with sample 13 therein. Preferably, thermistor 16 is submerged in the sample 13 until it rests on the test tube bottom 12. This is not necessary but preferred for reasons of consistency. Thermistor 16 is coupled to an electrical thermistor bridge circuit 34 as will be discussed further in detail hereinbelow.

The test tube 11 and its contents is placed in a cooling bath 17. For example, a dry ice/acetone bath maintained at −110° F. may be used. The test tube 11 is preferably submerged in bath 17 to a depth sufficient to cover the test tube 11 at a point above the sample 13 being tested. The sample 13 is then permitted to cool until its cooling curve shows a noticeable plateau as will be discussed below with respect to FIG. 3.

Thermistor 16 forms the variable resistance leg of a Wheatstone resistance bridge 35 (FIG. 2) and the output thereof is supplied to a suitable amplifier 36 and temperature recorder 37 for recording the signal from bridge 35 as the temperature changes in sample 13 thereby changing the voltage across bridge 35. The recorder 37 is preferably any electronic recorder that converts the signal from the Wheatstone resistance bridge 35 to a temperature reading.

The output of bridge 35 is also supplied to amplifier 38, the derivative of the input signal thereof being taken by differentiator 39 and voltage recorder 40 for amplifying inflection points in a cooling or warming curve with respect to time. Thus the circuit 34 utilizes the first derivative of the cooling curve to record on recorder 40 when the slope of the cooling curve approaches zero. This occurs whenever a plateau is reached as a change of state takes place in sample 13. Thus, the plateau is detected when the slope of the cooling curve, tracked by circuit 34, approaches zero as crystals begin to grow in sample 13 and impede the cooling rate.

At this time, test tube 11, and its contents (i.e., thermistor 14 and sample 13), is transferred to an insulated container, as for example, the polyurethane insulated cup 18 of FIG. 2. The apparatus in FIG. 2 is permitted to warm preferably in the atmosphere, at a very slow rate, such as 2° to 4° per minute. The slope of the differential reaches zero at the apex of the temperature or cooling/melting curve. This can be seen in the graph of FIG. 3 where time, $t$, is recorded along the X-axis while temperature, T, from recorder 37, is recorded along the upper Y-axis and volts, V, from recorder 40 is recorded along the lower Y-axis. Referring to the upper curve of FIG. 3, during the cooling step of FIG. 1, the curve begins to show a noticeable plateau at point P, P representing the crystal point type plateau in the cooling curve. This slope approaches zero as discussed previously and, during the warming step of FIG. 2, the slope reaches zero at the apex of the cooling/melting curve. As warming continues, the slope accelerates in a positive direction as the crystals in sample 13 gradually melt. As the last crystals melt, the slope of the curve momentarily accelerates (point M on the upper curve of the graph of FIG. 3) causing the first derivative electrical circuit 34 to produce a voltage peak (V.P. on the lower curve of the graph of FIG. 3) on recorder 40 of only a few seconds duration after which the slope of the cooling curve returns to a smaller value which remains rather constant until a much warmer temperature is reached (e.g., 30° F. warmer). The temperature recorded on recorder 37 when the first derivative of the melting (or warming) curve peaks is directly equivalent to the ASTM determined freeze point value.

EXAMPLE I

The following is an example of cooling curve data using the method of my invention with the temperature recorded at the bottom of the test tube vs. the first derivative of the warming rate with respect to time. The sample was kerosene which was cooled to its crystal point plateau and then warmed as discussed hereinabove. The freezing point of the sample was determined, using the ASTM method number D–2386, to be −47.8° C. As can be seen, the freezing point determined by the techniques of my invention is substantially directly equivalent, i.e., −48° C.

| Temperature | Voltage from Differentiating Circuit |
| --- | --- |
| −58°C | +0.10 |
| −56°C | +0.26 |
| −54°C | +0.36 |
| −52°C | +0.58 |
| −51°C | +0.74 |
| −49°C | +1.34 |
| −48°C | +2.90 |
| −48°C | +8.78 (Peak voltage) |
| −47.5°C | +6.40 |
| −47.0°C | +4.80 |
| −40.5°C | +4.40 |

EXAMPLE II

The freezing points of various kerosene samples were determined by both the aforementioned ASTM method and the method of my invention. As can be seen from the data given hereinbelow, the freezing points determined by the method of my invention are substantially directly equivalent to the freezing points determined by the ASTM method.

| Sample | ASTM Method | Invention Method |
| --- | --- | --- |
| Kerosene Sample No. 1 | −34.4°C | −34°C |
| Kerosene Sample No. 2 | −38.3°C | −39°C |
| Kerosene Sample No. 3 | −38.3°C | −38.5 C |
| Kerosene Sample No. 4 | −43.8 C | −45°C |
| Kerosene Sample No. 5 | −47.8°C | −49°C |
| Kerosene Sample No. 6 | −43.8°C | −44°C |

In summary, the apparatus and method described hereinabove may be used to quickly determine the freezing point of a fuel, such as kerosene. The operation of a distilling unit may be geared to product quality rather than temperature oriented by incorporating this technique of freezing point detection.

The technique of my invention, when incorporated in a process analyzer, will have a definite effect on operating costs because it provides the operator with the freezing points of the product being made at least two or possibly three times each hour. The results will be highly reliable and repeatable and, if used for control of the process, will lead to maximum product recovery (e.g., kerosene).

An analyzer in accordance with my invention could eliminate conventional ASTM testing on intermediate stocks which account for approximately 80 percent of the freezing point testing load. This would represent an appreciable reduction in manpower requirements.

It is necessary to optimize plant control so that the distilling unit may be operated closer to actual specification in order to minimize product give away. Freezing point apparatus in accordance with my invention located at the distilling unit could automatically provide the repetitive testing and precision necessary for process optimization.

I claim as my invention:

1. A method for determining the freezing point of a normally liquid composition having constituents which crystallize upon being cooled, said method comprising the steps of:
   depositing a liquid sample of said composition in a container;
   placing a temperature measuring device in said container at least below the level to said sample to produce a temperature curve of said sample;
   cooling said sample until the temperature curve of said sample shows a noticeable plateau;
   placing said container including said sample and said temperature measuring device therein in a warming means and warming said sample;
   recording the temperature curve produced by said temperature measuring means; p1 differentiating the temperature curve;
   continuing to warm said sample until a peak appears in the differential of said temperature curve; and
   recording the temperature of the sample at which said peak appears.

2. The method of claim 1 wherein the step of depositing a liquid sample in said container includes the step of depositing 25 milliliters of sample.

3. The method of claim 2 wherein the steps of cooling said sample includes the step of cooling said sample using a cooling medium of approximately −110° F., and
   the step of warming said container includes the step of warming said container at a rate of approximately 2° to 4° per minute.

4. The method of claim 2 wherein the step of placing said temperature measuring device in said container includes the step of placing said device in said container to substantially adjacent the bottom thereon.

* * * * *